Dec. 9, 1930.                R. D. FAY ET AL                1,784,137
                           SUBMARINE SIGNALING
                           Filed May 21, 1925            5 Sheets-Sheet 1
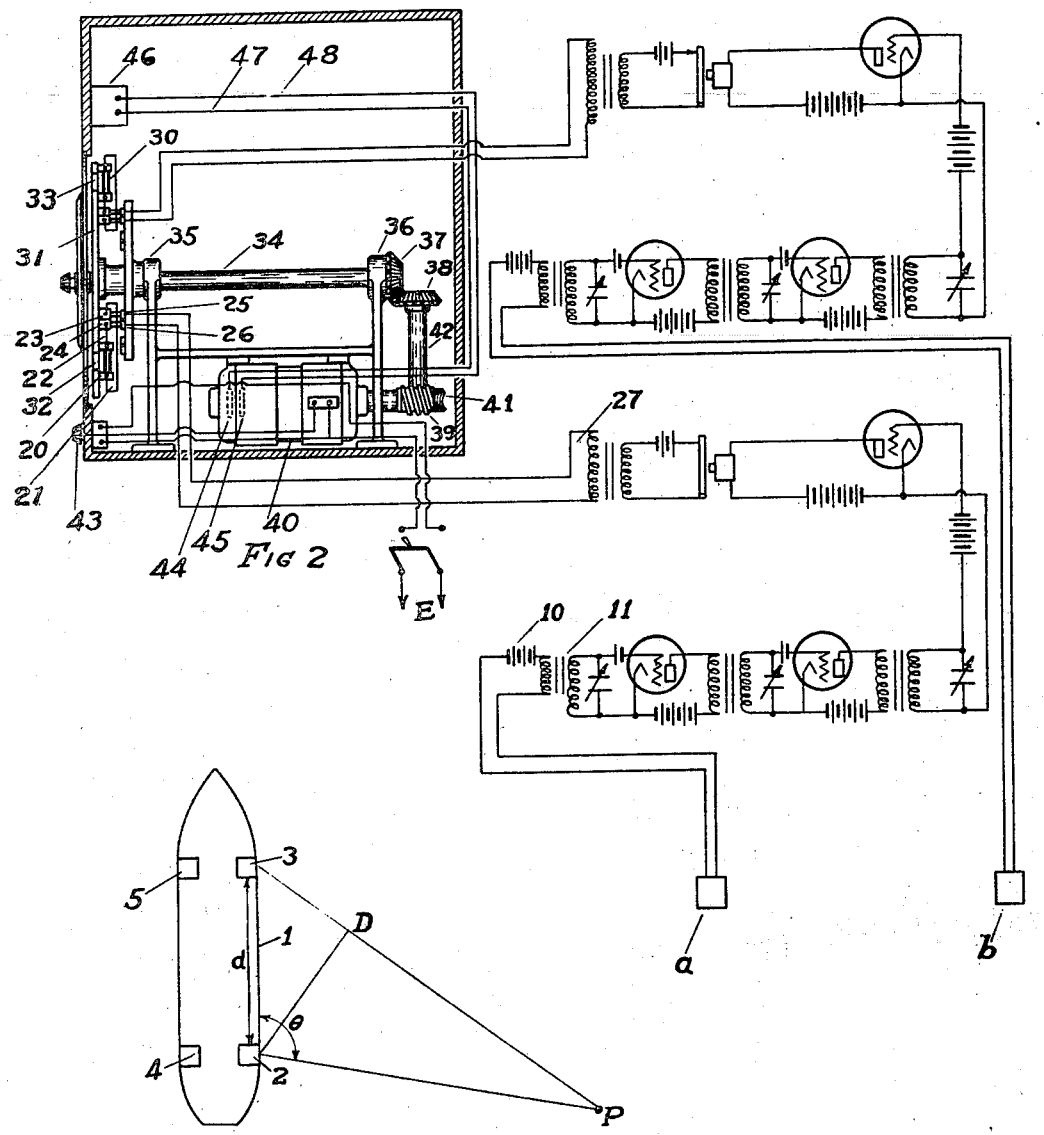
INVENTORS
Herbert Grove Dorsey
Richard Dudley Fay
by
Ezekiel Wolf
ATTORNEY Dec. 9, 1930.   R. D. FAY ET AL   1,784,137
SUBMARINE SIGNALING
Filed May 21, 1925   5 Sheets-Sheet 2

INVENTORS
Herbert Grove Dorsey
Richard Dudley Fay by

Ezekiel Wolf
ATTORNEY

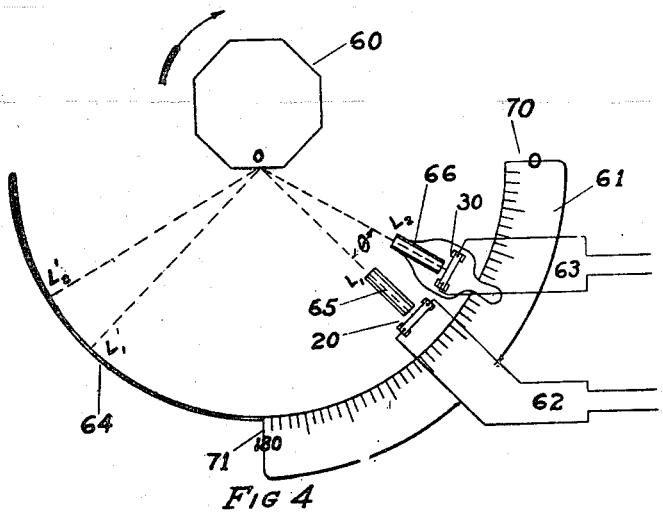
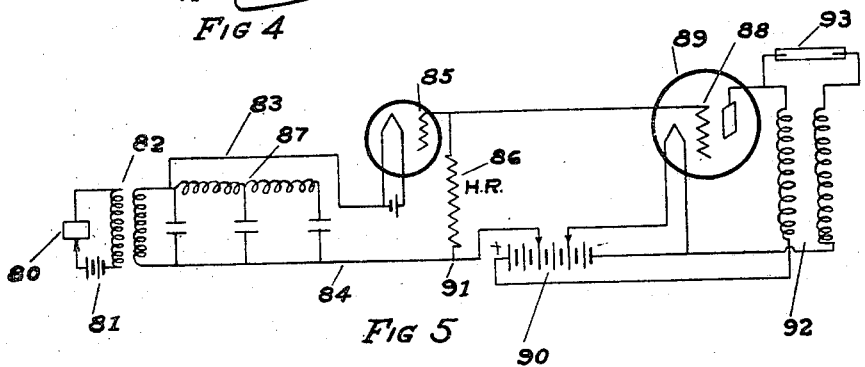
Fig 4
Fig 5

Patented Dec. 9, 1930

1,784,137

UNITED STATES PATENT OFFICE

RICHARD DUDLEY FAY, OF CAMBRIDGE, AND HERBERT GROVE DORSEY, OF GLOUCESTER, MASSACHUSETTS, ASSIGNORS TO SUBMARINE SIGNAL CORPORATION, OF BOSTON, MASSACHUSETTS, A CORPORATION OF DELAWARE

SUBMARINE SIGNALING

Application filed May 21, 1925. Serial No. 31,873.

The present invention relates to a method of determining the direction of a source of sound by comparing the indications of receivers spaced at known distances apart.

The invention is more particularly directed to a method and apparatus which will indicate visually to an observer the direction of a source. As opposed to the method described in this specification is the binaural method of determining the direction of sound. Since the binaural method demands the training of an observer to adjust for a central image of the sound and since, further, the listener must wear a pair of telephones on his ears and must, more or less, stay right near the apparatus, a visual method has indeed many advantages over the well known binaural method.

While the present apparatus has been employed mostly for the purpose of determining the direction of a source of sound, it will be readily seen that it has utility in other fields, especially for comparing phase differences of sound or electric impulses and also for the measurement of short time intervals, depth and distance measurement.

Further objects, uses, and purposes of the invention will be understood from the following description and drawing in which:

Figure 1 shows the position of receivers on board of a vessel.

Figure 2, an apparatus, partly schematic, for carrying out the invention.

Figure 3:
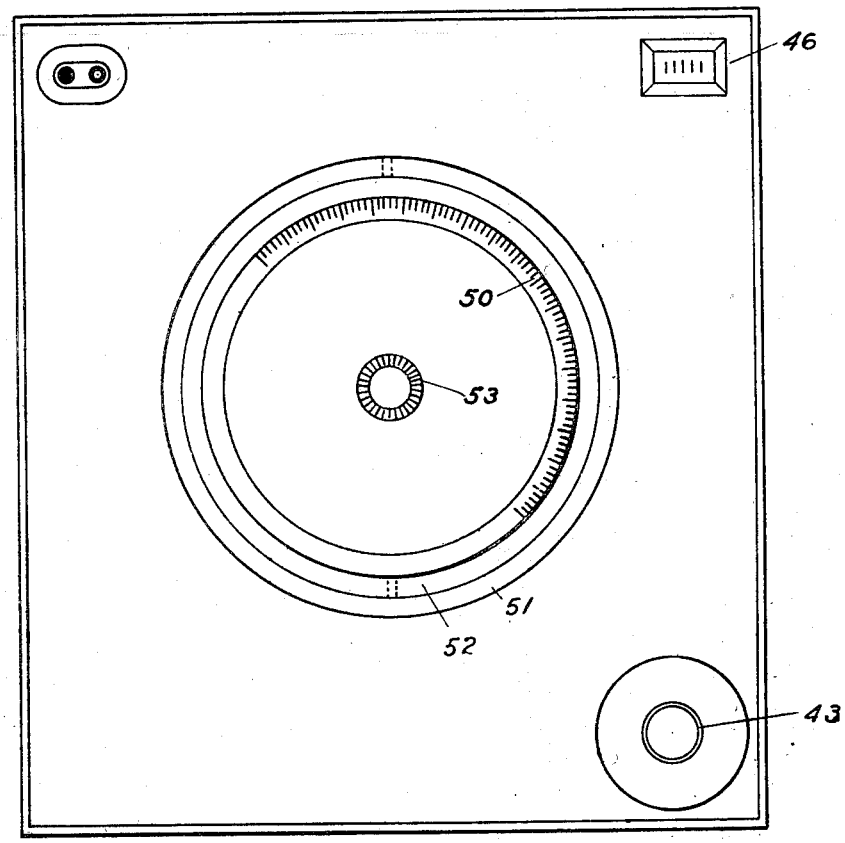

Figure 3, a front view of the box of Figure 2.

Figure 4, a modification of the indicating apparatus of Figure 2.

Figure 5, a circuit adaptable to receive the signal and operate the indicator.

Figure 6:
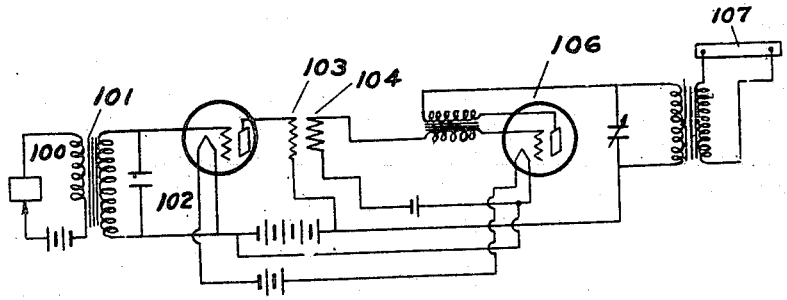

Figure 6, a modified circuit of Figure 5.

Figure 7:
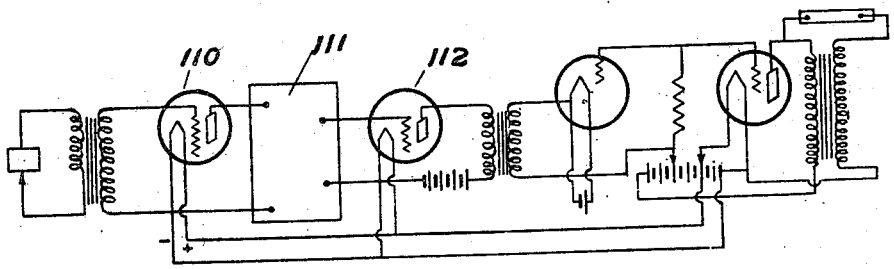

Figure 7, another modification of the circuit of Figure 5.

Figure 8:
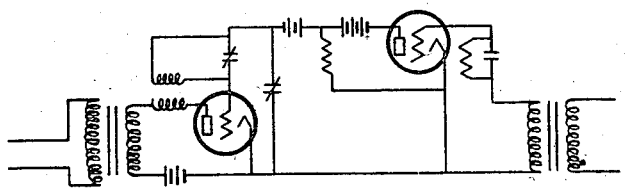
Figure 9:
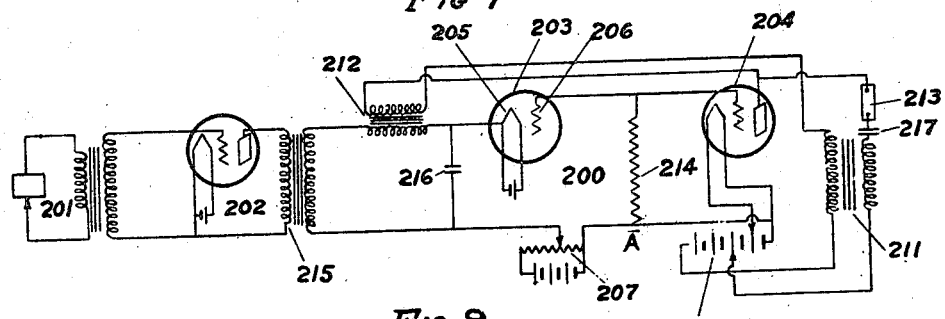

Figures 8 and 9, further circuits for operating the indicator.

Figure 10:
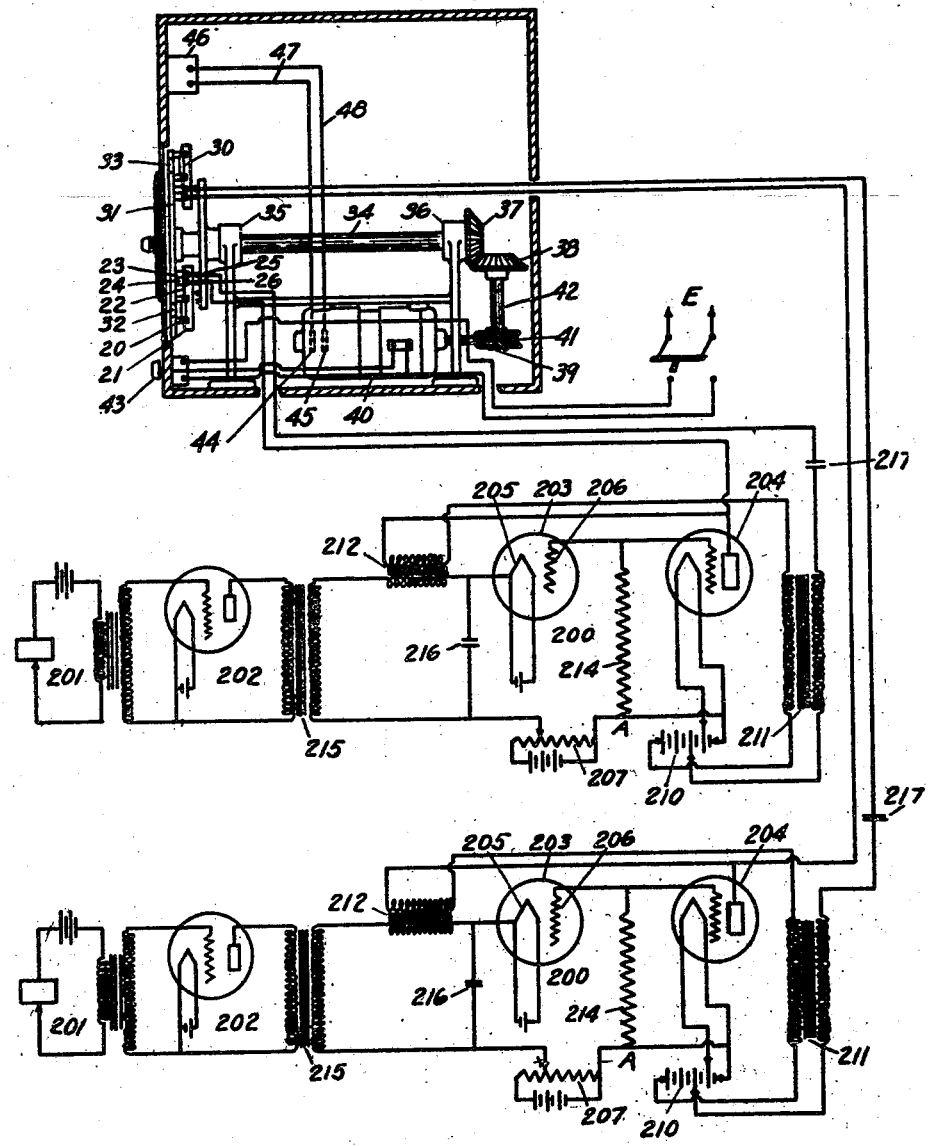

Figure 10 shows a modification of the system shown in Figure 2.

In Figure 1 is shown a vessel 1, in which are placed two receivers 2 and 3, spaced at a definite distance apart. There may be other receivers on the same ship at 4 and 5, for instance, so that not only starboard but also port direction may be observed. The receiver base can then conveniently be chosen as 5—3; 4—2; 5—4; or 3—2.

Figure 2 shows schematically in part, apparatus for performing the functions of the invention. The receivers are represented as $a$, and $b$, and may be any combination mentioned above. Each receiver passes the signal received through a detecting and amplifying circuit before reaching the indicator. Since the circuits for each receiver are similar, only one will be described. The circuit connected to the receiver $a$, which is shown as a microphone, is composed of a battery 10, a primary of a transformer 11, and suitable leads connecting the elements in series. The secondary of the transformer acts as an input to the amplifying and operating circuit, which is similar to the circuit shown in the United States Patent No. 1,667,540 granted to Herbert Grove Dorsey, April 24, 1928.

The indicator of the circuit consists preferably of a discharge tube 20 connected through leads 21 and 22 to the brushes 23 and 24 respectively, which connect to the commutator rings 25 and 26 connected to the output side 27 of the amplifying circuit. In a similar manner the receiver $b$ is connected to the discharge tube 30. The discharge tubes are mounted upon the back of a disc 31 and show through slits 32 and 33 therein. The disc 31 is rotated by a shaft 34 supported upon bearings 35 and 36. At the end of the shaft near the bearing 36 is a bevel gear 37 meshing with a second bevel gear 38 which is driven by a motor 40 through the worm 39, gear 41 and shaft 42.

The motor which thereby drives the disc 31 is held at constant speed by proper adjustment of the potentiometer 43 which directly governs the voltage supplied to the motor from the power source E. The slip rings 44 and 45, tapped to the winding of the armature of the motor, are connected to the frequency meter 46 through the wires 47 and 48 so that the speed of the motor is known at all times by the agitation of the reeds of the frequency meter, since the speed of the motor depends upon the frequency of its generated counter electromotive force.

In Figure 3 is shown a front view of the indicating mechanism of Figure 2. The dial 50 may be adjusted in any position within the circumference of the indicating rings 51 and 52 by turning the hand knob 53.

The operation of the apparatus described above is as follows: Suppose that the source of sound is off in the direction P indicated in Figure 1. Then P2 is the line to receiver 2 and P3 is the line to receiver 3. Since the two paths are indicated as having different lengths, as shown, the sound will arrive at 2 before it arrives at 3. The difference of the time of arrival of the signal at the two receivers is to a close approximation equal to the time it takes the signal to travel the distance D3. Since the distance $d$ between receivers is always small as compared to the distance of the sound source, 2D may be considered perpendicular to DP and 2P, and the distance D3 may be set as equal to $d \cos \theta$. Since the space $d$ is a constant, the measurement of the $d \cos \theta$ will give an indication of the angle $\theta$ which is the direction of the sound source.

The speed of the disc is so adjusted that if the sound source were dead astern, the indications given respectively by the indicators 20 and 30 operated by the agitation of their respective receivers would occur at the same spot on the scale. If the indicator associated with the bow microphone 3 were red and the stern microphone 2 green, then the order of flashing or indication would be first green and then red. The proper speed for such an adjustment is that the disc should make one half a revolution in the time sound could travel the distance $d$ in water. Thus, if the distance $d$ were 200 feet, the time necessary for sound to travel this distance would be approximately 1/24 of a second, and the necessary speed of the disc would be 720 revolutions per minute. Other combinations would, of course, produce other speeds.

If the source were dead astern, then first a green signal would flash and then a red, the position of both being on the same spot on the dial. If the source was square off the starboard the indicators would both operate simultaneously and since they are positioned 180 degrees apart the indications would be 180 degrees apart on the dial. In this arrangement the scale 50 will not be uniform but will be graduated in degree divisions proportional to the $\cos \theta$, Figure 1, and therefore will be crowded for sound coming from directions near the bow or stern of the vessel.

Perhaps a better system would be to have the indicators together instead of diametrically opposite, and also to have the disc make one quarter of a revolution in the time the sound can travel the distance $d$. In this manner the angle of the source of sound from the starboard could be read directly. This is easily understood. Sounds coming directly from the starboard will arrive at receivers 2 and 3 simultaneously and affect the indicators likewise simultaneously, which being together will give a zero angle. If the sound comes from directly forward, 3 will cause a flash of its indicator one quarter of a revolution before 2 will cause a flash of its indicator and if astern the order of flashing will be reversed but the angle will be the same. The use of different colors or slightly different positions, as for instance, in Figure 3 where each indicator revolves in a particular circular path can serve to do away with the ambiguity of direction. One of the discharge indicators in either event may be colored red and the other green. In this modification the scale will also not be uniform but will be graduated proportional to the $\cos \theta$.

Whether the indicators are mounted 180° apart or together the operation of the device is the same. The speed of the disc 31 is first adjusted to the correct constant speed, namely 720 R. P. M. in the first case and 360 R. P. M. in the second case, assuming the distance between hydrophones to be 200 feet. When a sound is heard from a distant source or when the indicators flash periodically, indicating that a distant submarine bell or oscillator is sounding its code signal, the dial 50 is turned by the knob 53 simply in a convenient manner to measure the angular difference between the positions of the two indications. This may, for example, be done by turning the zero of the scale 50 to the point at which the first flash occurs and then reading the point of the second flash on the scale. According to the adjustment of the speed of the rotary disc 31 and the position of the indicators on the disc the direction of the source could be given directly.

The modification shown in Figure 4 differs from that in Figure 2, in that in the former figure the flashes are apparently brought together and the amount of adjustment in bringing the flashes together gives an indication of the angular direction. The modification of Figure 4 will be explained more in detail.

In place of the disc 31, in Figure 2, is substituted a rotating mirror which rotates at a uniform constant speed maintained and determined by the same apparatus as is indicated in Figure 2. In Figure 4, one of the discharge tubes 20 is permanently fixed while the second tube 30 is adjustable in an arc. The arc 61 need be no more than one quarter of the circumference.

The principle involved is best described by the operation. If the receivers connected with the circuits 62 and 63, respectively should receive the signal from the source whose direction is to be determined simultaneously, and the indicators 20 and 30 should indicate accordingly simultaneously, then to have the indications occur at the same position of the screen 64 which is either of ground glass or some other suitable material, the angle between the indicators 20 and 30 should be zero. In Figure 4 these indicators are mounted one above the other so that they may be made to reflect at the same point on the screen. If the indications should occur at different times when the indicators are placed together, then the images would be thrown apart a given definite angle depending upon the angular velocity of the mirror. In Figure 4 if the indications are simultaneous, and $\theta$ is the angle between the lines L1 and L2 of the beam of the indicators through the focusing tubes 65 and 66, the angle of the reflected beam will also be equal to $\theta$. If, however, the indications were to occur at different times, then the angle of the reflected beams $OL_1$ and $OL_2$ would be changed, dependent upon the speed of the rotated mirror. If the mirror should rotate through an angle $\omega$ between the times of the occurrences of the two indications, then it can be shown mathematically that it will be necessary to separate the indicators so that the angle in Figure 4 is equal to $2\omega$. Thus, if the sound was coming directly from the bow and consequently the time interval were the time necessary for the sound to travel the distance $d$ in Figure 1, for an angular difference of $\theta = 45°$ the mirror would have to rotate 1/16 of a revolution to have the images coincide. If $d$ were 200 feet, equivalent to 1/24 of a second, the speed of the mirror would have to be 24/16 revolutions per second, or 90 revolutions per minute. In this way the scale 61 could be marked just double the actual angle starting at the point 70 with 0 degrees, meaning that the sound is coming directly from the bow and ending with the point 71 with 180 degrees, meaning that the sound is coming directly from the stern. For this calibration the fixed indicator will have to be fixed in the bisector of the scale which is marked 90°. The ambiguity as to whether the direction of the source is from the forward quarter or the after quarter can easily be removed by having the indicators colored differently. It also may be noted that for a given direction of rotation of the mirror, the relative shifting of the images will assume definite directions with one another when the indicators are shifted. If in Figure 4 the mirror was rotating clockwise and 30 was connected to the forward sound receiver, while 20 to the stern receiver, then by moving 30 clockwise from its present relative position with respect to 20, towards 20 for a signal coming from the bow, the image of 30 would shift towards the left of the image of 20. If the sound was coming from the stern the same movement of 30 would shift the image of 30 towards the right of the image of 20.

The calibration of the arc 61 may, therefore, be made directly in terms of angular bearing on one half of the ship as when the combination of receivers 2 and 3 of Figure 1 are used. Similarly the direction of the port side may be determined by proper use of the receivers 4 and 5.

In Figures 5, 6, 7, 8, and 9 are shown circuits which are useful in operating the indicators 20 and 30. In Figure 5, 80 is the microphone for receiving the sound connected in the usual microphonic circuit with battery 81 and transformer 82. The secondary of the transformer is connected to a circuit which is both an amplifying and an indicating circuit. One lead 83 connects to the cathode of a detector tube. The other lead 84 connects to the anode 85 of the same tube through a high resistance 86. Shunted between the leads 83 and 84 is an artificial line 87 equivalent to 1/4 the wave length of the wave of the signal which is to be received. The anode 85 is connected directly to the grid 88 of the tube 89 as shown in Figure 5. The filament of the tube 89 connects through the battery 90 to the point 91. The plate of the tube 89 connects to the input of the transformer 92 whose primary and secondary are in series with the discharge indicator 93 of the same type as 20 in Figure 2. The secondary of the transformer connects to the positive end of the battery 90 so that the battery, primary of the transformer discharge tube, secondary of the transformer are all in series in the order named. The neon tube 93 quite often requires considerable voltage to produce a flash. The connection of the primary and secondary of the transformer 92, in series with the tube 93 and in series with the battery 90, allows a higher potential to be impressed upon the tube. The battery 90 provides an initial potential and the two windings in series furnish a greater reaction in the plate circuit of the tube 89 so that the change may be more rapid.

The operation of the circuit is as follows. The signal which is received on the microphone 80 is of the frequency corresponding to that adapted for the amplifying and operating circuits. The signal in this case has a sinusoidal wave so that the artificial line of 1/4 of its wave length builds up a maximum difference in potential between the cathode and anode of the detector tube. When the anode becomes positive with respect to the cathode an increased flow of electrons occurs so that the potential of the grid 88 is also raised, but since current is flowing in the filament plate circuit of the tube 89 an increase of current can be regulated so that the discharge tube will not operate. When, however, the anode 85 becomes negative then the grid 88 also becomes negative and the current in the filament plate circuit of the tube 89 is practically made zero so that the sudden change of current operates to discharge through the discharge indicator 93. There may be inserted before the detector and the amplifying operating circuit one or more amplifying circuits so that the potential change of the signal may be amplified. This is illustrated in Figure 7.

In Figure 6 which is a further modification of the receiving circuit, the microphone circuit 100 is the same as that of Figure 5. The secondary of the transformer 101 impresses the signal upon a tuned amplifying circuit 102 which has a heating element 103 adapted to be heated by the change in filament plate current created by the action of the signal upon the circuit 102. A thermocouple 104 of any suitable type and size acts to change the potential of the grid of the tube 106 in a regenerative feed back circuit. The discharge indicator 107 is operated through a transformer by the change in filament plate current of the tube 106 brought about through the action of the thermocouple in controlling the grid of the tube 106.

As has been explained above Figure 7 shows a circuit similar to that of Figure 5. Here the signal is first amplified through the amplifying tube 110, then filtered through the filter shown as 111, and again amplified in the tube 112. The rest of the circuit is similar to that shown in Figure 5.

The circuit shown in Figure 8 is that shown and described in the United States Patent No. 1,667,540, granted to Herbert Grove Dorsey, April 24, 1928, which can easily be adapted to be used in the present system.

The circuit shown in Figure 9 is especially adaptable to the present method of direction finding. Here the trigger circuit 200 is separated from the microphone circuit 201 by means of a simple amplifying circuit 202. The amplifying circuit 202 serves not only to amplify the signal which is received but also to prevent reactive effects of the trigger circuit by packing and harming the microphone. Since the trigger circuit is operated in most cases in less than the first half cycle of the signal, there is no chance for a building up either of mechanical oscillations or electrical oscillations as is done in tuned systems by means of the successive cycles of the signals.

The point A of the circuit is the point of low potential. With respect to this the filament 205 of the tube 203 is at a slightly positive potential. The anode or grid 206 is at the same potential as the grid of the tube 204 both of which are at the same potential as the point A when no current flows through the high resistance 214. The potential of the filament 205 is regulated by a potentiometer 207 while the potential of the plate of tube 204 is maintained positive with respect to the filament of the tube by the battery 210, a part of which also provides potential for the indicating circuit involving the primary and secondary of transformer 211 the primary of transformer 212 and the discharge indicator 213 thereby increasing the available potential for operating the discharge tube. The condenser 216 serves to tune somewhat the circuit involving the input transformer 215 and the transformer 212.

The action of the circuit is one of a transient phenomena. The incoming signal, after it is amplified by the circuit 202, is impressed upon the trigger circuit 200. If the current is in such a direction that the filament 205 is made more positive, then nothing takes place in this half cycle. When, however, the signal makes the filament 205 negative as it is bound to do within the interval of one half cycle, an electron flow takes place from 205 to 206 making the grid 206 negative and causing the potential of the grid 206 to fall below that of the point A. The grid of the tube 204 also becomes negative falling below that of the filament of the same tube. Normally a plate current is flowing in the filament plate circuit of the tube 204 but when the grid of the tube 204 becomes negative this plate current suddenly ceases causing a discharge through the indicator 213. The manner in which this plate current suddenly ceases is understood to be as follows. When the grids begin to go negative the change of plate current which necessarily follows, since there is a tendency to force the electrons back upon the filament, builds up a positive potential upon the plate in a manner which is always present in an inductive circuit. This voltage change is employed by means of the feed back 212 in the proper direction which appears to be a reverse feed back to make the grids go still further negative and prevent any flow of electrons from the filament. In this manner then the filament plate circuit in the amplifying tube practically has an infinite impedance when this action takes place which, of course, is equivalent to an open circuit. In making this filament plate circuit change from a circuit of ordinary impedance to one of infinite impedance the action takes place so quickly that a high voltage is impressed across the discharge tube 213 to cause a flash of this tube. In the first instance before any change occurs it will be noted that the grids are approximately at the same potential as the point A since very little current flows through the high resistance 214 which is of the order of from 5 to 20 megohms.

When, however, the negative potential becomes impressed upon the grids a slight current flowing through the resistance 214 will place the potential of the grid considerably lower than that of the point A. Since through a resistance the current and voltage are in phase, the potential change occurs at the same time the current flows and, therefore, the potential of the grids will change simultaneously with the flow of current through the high resistance. Since the potential difference brings about the change in action it will be advantageous in some cases to have this action lead the flow of current in which event an impedance in place of a pure resistance appears to be helpful.

It will be obvious of course that if the change back to normal conditions, that is the establishment of the filament plate current, should occur as rapidly as the original action, a similar discharge could be obtained. This is prevented by regulating the time in which the charge leaks off the grids. Aside from this consideration, however, to prevent the same signal from operating the indicator again, it is only necessary to have the charge stay on the grids for one half cycle of the signal since every half cycle there is a tendency to charge the grids negative, which would prevent any tendency to establish filament plate current until the original signal had ceased.

In order to prevent an oscillation in the discharge circuit which would produce more than one discharge and to prevent a continuous circuit for the direct current of the battery 210, a small condenser 217 is inserted between the discharge tube and the secondary of the transformer 211. It will also be noted that in Figure 9 the circuit including the tube 213 and the secondary of the transformer 211 is a part of the plate circuit of the tube 204 and benefits by the direct change of the plate current through it as well as by the change induced through the transformer 211.

In Figure 10 the apparatus shown in Figure 2 is shown connected to a circuit of the kind shown in Figure 9. The procedure in operating the device shown in Figure 10 is similar to that described for Figure 2.

In this manner, therefore, a bright momentary illumination is produced by the discharge tube which illumination is so rapid that the velocity of the tube about the dial has very little effect upon increasing the width of the flash as ordinarily would take place when an illuminated mark is rotated. However, although the illumination is only momentary, there is sufficient light so that an impression will be made upon the eye of the observer which, due to the persistence of vision, will associate itself with a particular spot upon the dial or screen. This is necessary for in most cases the illumination caused by a distant source of sound will not appear the second time in exactly the same spot as the first time. For instance in the device shown in Figure 3 when a distant source is detected the signal may register when the discharge tube or indicator is in any position. In any case, of course, the relative position of the indications of the two indicators from the same signal will furnish the determination of direction. However, in order to have the indications appear at the same place upon the dial, certain conditions would have to be present which ordinarily could not be controlled. If the source were fixed and the detecting vessel fixed then in addition the period of the signal would have to be synchronized with the period of rotation of the indicator. Such a condition would, of course, be very rare. Therefore, the position of the indications will successively vary so that the persistence of the image upon the eye will have to be relied upon to place the occurrence of the flash. The flash has been designed to accomplish this feature by providing a sufficient amount of illumination to make an impression upon the eye. If additional persistence is required the dial in front of the flash may be made slightly fluorescent with some proper material so that the image will persist longer than the flash and still not be drawn out. In this manner the persistence of the image may be made long enough so that a setting can easily be made.

Having now described our invention we claim:

1. An apparatus for determining the direction of a source of sound comprising spaced receivers responsive to said sound, visual indicators, means for operating said visual indicators by the action of said receivers, each receiver being associated with a different indicator, a rotating disc, said indicators mounted upon said rotating disc, a dial concentric with said rotating disc, means for adjusting the dial to measure the angle between the indications of said rotating indicators whereby the direction may be determined.

2. A system for determining the direction of a source of sound comprising two receivers responsive to said sound spaced a fixed distance apart from one another, two visual indicators, means connecting said receivers to said indicators for making the latter responsive to signals received by said receivers each of said receivers being associated with different indicators, a scale and means for rotating said indicators past said scale at a constant velocity such that the time necessary for a signal to travel from one receiver to the other is commensurable with the period of rotation of said indicators.

3. A system for determining the direction of a source of sound comprising two receivers spaced a fixed distance apart from one another, two visual indicators, means connecting said receivers responsive to said sound to said indicators for making the latter responsive to signals received by said receivers, each of said receivers associated with different indicators, a scale, means for rotating said indicators past said scale at a constant velocity such that the time necessary for a signal to travel from one receiver to the other is commensurable with the period of rotation of said indicators and means for moving said scale to obtain a desired position with reference to said indicator.

4. A system for determining the direction of a source of sound comprising two receivers spaced a fixed distance apart from one another, two indicators, means connecting said receivers responsive to said sound to said indicators for producing a momentary illumination of said indicators upon the receipt of a signal by said receivers, each of said receivers associated with different indicators, a vertically disposed disc having said indicators mounted thereon, means for rotating said disc, a dial positioned in front of said disc and means for rotating said dial about the same axis as said disc whereby the scale of the dial may be shifted to any desirable position with reference to the indicators, the time necessary for the signal to travel from one receiver to the other being commensurable with the period of rotation of said indicators.

5. A system for direction finding comprising two sound receivers spaced a fixed distance apart from one another, two indicators, a disc having said indicators mounted at opposite ends of a diameter thereof, means for rotating said disc at a constant speed such that the time for a sound signal to travel from one receiver to the other in commensurable with the period of rotation of said indicators, a dial positioned concentric with said disc, means for adjusting said dial with respect to the disc and means for causing the signal received by said receivers to illuminate momentarily said indicators.

6. An apparatus for determining the direction of a source of sound comprising a plurality of receivers responsive to the sound waves from said source, a plurality of indicators each associated with a sound receiver, means for causing the sound received by said receivers to produce a momentary visual indication on said indicators, means for rotating said indicators at a constant speed and means for measuring the angular deviation between the indications whereby the direction of the source may be determined.

7. An apparatus for determining the direction of a source of sound comprising a plurality of receivers responsive to the sound waves from said source, indicating means associated with said sound receivers, means for causing the sound received by said receivers to produce visual indications of said indicating means, constantly rotating means for producing a deviation of said indications and means for measuring the said angular deviation whereby the direction of the source may be determined.

8. An apparatus for determining the direction of a source of sound comprising a plurality of receivers responsive to the sound waves from said source, a plurality of indicators each associated with a sound receiver, means for causing the sound received by said receivers to produce a momentary visual indication on said indicators, means for rotating said indicators at a constant speed, means for causing the said visual indications to persist at fixed points and means for measuring the angular deviation between the indications whereby the direction of the source may be determined.

9. An apparatus for determining the direction of a source of sound comprising a plurality of receivers responsive to the sound waves from said source, indicating means associated with said sound receivers, means for causing the sound received by said receivers to produce visual indications of said indicating means, constantly rotating means for producing a deviation of said indications, means for causing said indications to persist at fixed points and means for measuring the said angular deviation between said fixed points.

10. An apparatus for determining the direction of a source of sound comprising a plurality of receivers responsive to the sound waves from said source, indicating means associated with said sound receivers, means for causing the sound received by said receivers to produce visual indications of said indicating means, means rotated at a uniform speed for producing a deviation of said indications, means for causing said indications to persist at fixed points, and a scale manually adjusted for measuring the said angular deviation between said fixed points.

11. An apparatus for determining the direction of a source of sound comprising a plurality of receivers responsive to the sound waves from said source, a plurality of indicators each associated with a sound receiver, means for causing the sound received by said receivers to produce a momentary visual indication on said indicators, means for rotating said indicators at a constant speed, means for causing the said visual indications to persist at fixed points, and a scale, manually adjusted, for measuring the angular deviation between the points of persistence of the said indications.

12. An apparatus for determining the direction of a source of sound comprising a plurality of receivers responsive to the sound waves from said source, a plurality of indicators each associated with a sound receiver and adapted to produce a distinguishable indication between one another, means for causing the sound received by said receivers to produce a momentary visual indication on said indicators, means for rotating said indicators at a constant speed and means for measuring the angular deviation between the indications whereby the direction of the source may be determined.

13. An apparatus for determining the direction of a source of sound comprising a plurality of receivers responsive to the sound waves from said source, a plurality of indicators each associated with a sound receiver and each producing a different visual indication, means for causing the sound received by said receivers to produce a momentary visual indication on said indicators, means for rotating said indicators at a constant speed and means for measuring the angular deviation between the indications whereby the direction of the source may be determined.

In testimony whereof we affix our signatures.

HERBERT GROVE DORSEY.
RICHARD DUDLEY FAY.